United States Patent
Kappmeyer et al.

(10) Patent No.: US 8,689,442 B2
(45) Date of Patent: Apr. 8, 2014

(54) METHOD FOR THE FABRICATION OF INTEGRALLY BLADED ROTORS

(75) Inventors: Gregor Kappmeyer, Bad Homburg (DE); Gregor Riedel, Buedingen (DE)

(73) Assignee: Rolls-Royce Deutschland Ltd & Co KG (DE)

(*) Notice: Subject to any disclaimer, the term of this patent is extended or adjusted under 35 U.S.C. 154(b) by 1039 days.

(21) Appl. No.: 12/385,375

(22) Filed: Apr. 6, 2009

(65) Prior Publication Data

US 2009/0282680 A1    Nov. 19, 2009

(30) Foreign Application Priority Data

Apr. 4, 2008   (DE) .................. 10 2008 017 494

(51) Int. Cl.
  *B23P 15/02*   (2006.01)
(52) U.S. Cl.
  USPC ...................................... 29/889.23; 29/889.7
(58) Field of Classification Search
  USPC .............. 29/889.23, 889.2, 889.7, 557, 558
  See application file for complete search history.

(56) References Cited

U.S. PATENT DOCUMENTS

| | | | | |
|---|---|---|---|---|
| 5,556,257 | A * | 9/1996 | Foster et al. | 416/241 R |
| 6,877,207 | B1 * | 4/2005 | Barnhardt | 29/558 |
| 6,905,312 | B2 * | 6/2005 | Bourgy et al. | 416/234 |
| 2003/0024825 | A1 | 2/2003 | Lamphere et al. | |
| 2003/0039547 | A1 | 2/2003 | Bourgy et al. | |
| 2005/0278127 | A1 * | 12/2005 | Griffin et al. | 702/56 |
| 2006/0085979 | A1 | 4/2006 | Bayer | |
| 2006/0131184 | A1 | 6/2006 | Mielke | |
| 2007/0124933 | A1 * | 6/2007 | Burgess et al. | 29/889.7 |

FOREIGN PATENT DOCUMENTS

| | | |
|---|---|---|
| DE | 44 09 769 A1 | 9/1995 |
| DE | 102 58 920 A1 | 7/2004 |
| DE | 102004001394 A1 | 8/2005 |
| DE | 102004051854 | 4/2006 |
| DE | 102004051854 A1 | 4/2006 |
| DE | 102006002617 | 7/2007 |
| DE | 102006002617 A1 | 7/2007 |
| EP | 0 327 657 A1 | 8/1989 |
| EP | 0327657 | 8/1989 |
| EP | 1 433 557 B1 | 6/2008 |
| WO | WO 2005/065885 A1 | 7/2005 |
| WO | 2006012852 | 2/2006 |

OTHER PUBLICATIONS

European Search Report dated May 9, 2009 from counterpart European patent application.

* cited by examiner

*Primary Examiner* — David Bryant
*Assistant Examiner* — Christopher Besler
(74) *Attorney, Agent, or Firm* — Timothy J. Klima; Shuttleworth & Ingersoll, PLC

(57) ABSTRACT

With the fabrication of integrally bladed rotors or stators (blisks) for gas-turbine engines, where the space confined by the pressure and suction side as well as the annulus surface is shaped by cutting and machining from the solid material, starting at the periphery of a ring or disk, a stiffness-optimized pre-machining contour is cut out in a cutting process at a certain distance from the pressure and suction side along straight control surfaces at a cutting angle varying in correspondence with the blade twist and along a conical surface extending at a certain distance from the annulus surface as well as along transition surfaces between the conical and the control surfaces, and subsequently finish machined by finish milling to produce the final contour of the blade, annulus and transition surfaces. The method reduces tool wear and is cost-effective.

12 Claims, 1 Drawing Sheet

METHOD FOR THE FABRICATION OF INTEGRALLY BLADED ROTORS

Figure 2:
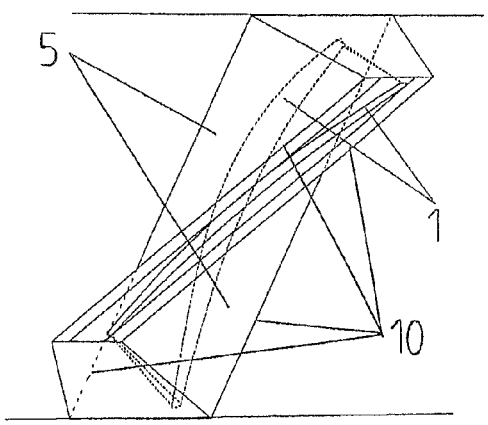

This application claims priority to German Patent Application DE102008017494.7 filed Apr. 4, 2008, the entirety of which is incorporated by reference herein.

The present invention relates to a method for the fabrication of integrally bladed rotors or stators for gas-turbine engines, where the space between the blades confined by the pressure and suction side as well as the annulus surface is shaped by cutting and machining from the solid material, starting at the periphery of a ring or disk.

Under the aspects of reliability, weight reduction, performance increase and service life, gas-turbine rotors, and in particular the rotors of the compressors of gas-turbine engines, are provided with a one or multi-stage blading which is integrally formed on the annular periphery of a disk or drum. Such components are termed "blisks" or "blisk drums". As is generally known, blisks are fabricated by welding, in particular friction welding, separately manufactured blades to the peripheral surface of the preferably forged disk or drum or by a cutting or chemical stock removal process starting at the outer surface of the latter. Upon shaping the blades by the known material removal processes, the blade surfaces and edges and the bottom thereby produced between the blades, which is termed annulus, are finish machined.

The blisk blades are usually shaped from the solid material in a five-axis milling process, actually by an initial rough milling operation in which the bulk of material between two opposite sides of adjacent blades is removed and a subsequent finish milling operation in which the final blade contour is produced. Machining time and tool wear, and thus manufacturing costs, are very high for blisks made of titanium materials, and are even higher for high-temperature resistant materials, such as nickel-base alloys (INCONEL® 718, for example). Particularly high is the manufacturing effort in the case of large blisk blades machined from the solid, not only because of the large amount of stock to be removed, but also because of the bad accessibility for the cutting tools to the surfaces of the closely spaced and even cambered and twisted blades and, further, the susceptibility to vibration of the larger blades during the machining process entailing reduced machining parameters.

A broad aspect of the present invention is to provide a method for the fabrication of blisks, with the blades being shaped from the solid material, the method enabling a reduction of the manufacturing costs to be achieved, especially when high-temperature resistant and brittle-hard materials are used.

In essence, the present invention, which is applicable to both rotors and stators with integral blading machined from the solid, provides a stiffness-optimized pre-machining contour by cutting, preferably by abrasive waterjet cutting, the blade interspaces, performing essentially straight cuts, and subsequent finish milling to the final contour. As regards its stiffness, the pre-machining geometry so produced is sized such that the subsequent finish milling process is not compromised. During the cutting operation in the interspace between two adjacent blades, straight cutting faces are produced at a certain distance from the two opposite blade sides which follow the twist of the blades and, via transition surfaces, pass into a conical surface produced at a certain distance from the intended annulus surface.

Compared with the known process of shaping the blades solely by machining, the method according to the present invention is characterized by reduced tool wear and costs. During shaping, the blades are subject to lesser thermal and mechanical load so that structural changes and deformations are avoided and blades in brittle-hard and high-temperature resistant material can be fabricated in high quality even if they have great length. Since milling is confined to finishing, the interspaces between large blades are better accessible and the blades are less susceptible to vibration. The time and cost investment for blisk manufacture can be significantly reduced.

In accordance with a further characteristic of the present invention, the pre-machining contour is shaped by five-axis waterjet cutting equipment programmed on the basis of a 3D model of the pre-machining contour. The control surfaces of the 3D model for cutting the straight cut surfaces in longitudinal direction of the blades and at a cutting angle set in correspondence with the blade twist are established by distance lines which extend transversely to the blades and at a certain distance parallelly to tangential lines applied to the pressure and suction side of the blade in the intended final contour of the latter. The 3D model for programming the waterjet cutting equipment is reviewed in a FEM (finite element model) simulation and, if necessary, modified, taking into account the load situation to which the workpiece is exposed during finish machining after cutting.

In a further development of the present invention, cutting of the straight cut surfaces in correspondence with the control surfaces of the 3D model can also be accomplished by laser cutting, plasma cutting or wire spark erosion.

Figure 1:
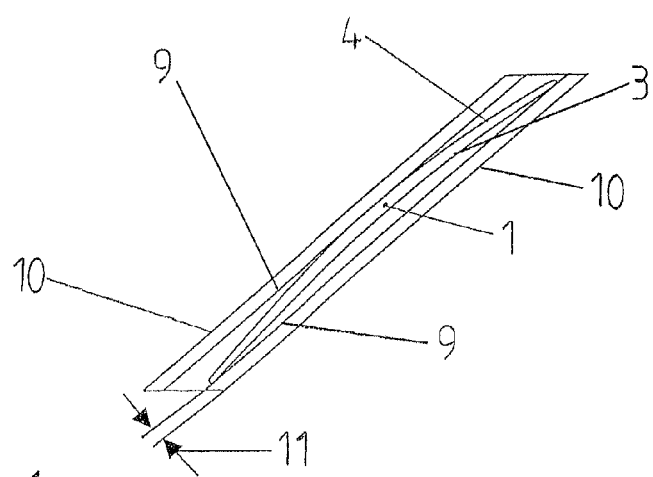
Figure 3:
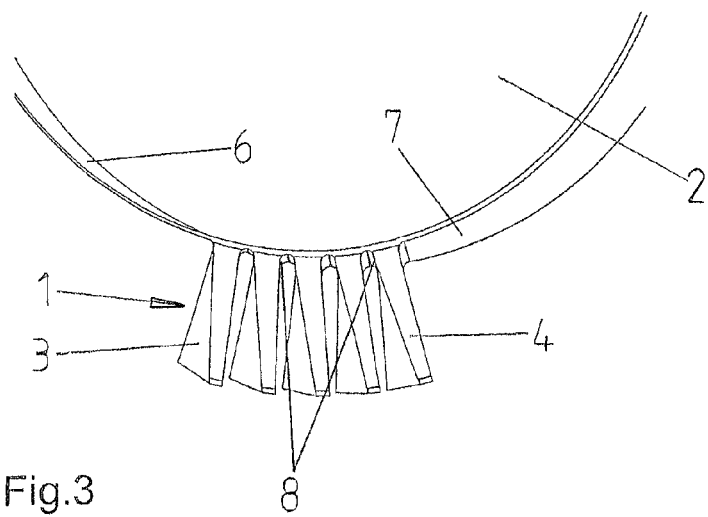

An example of the present invention is more fully described in light of the accompanying drawings, where FIGS. 1 to 3 show the generation of an auxiliary geometry by use of a CAD design software for cutting a pre-shape of the blisk blades of a compressor stage from the solid material. In the drawings, FIG. 1 shows a horizontal section of a blisk blade to be manufactured with tangential lines applied to the pressure and suction side and with distance lines associated to the tangential lines, FIG. 2 is a representation of the 3D model of a blisk blade premachining contour for waterjet cutting the side faces, with the 3D model being produced on the basis of the tangential lines as per FIG. 1, and FIG. 3 is a partial view of a 3D model of a blisk used as basis for stiffness simulation of the premachining contour of the blades and NC programming of waterjet cutting and milling of the individual blisk blades from the solid material.

Shaping of the individual blisk blades 1, which in the example here shown, are provided for a blisk arranged in the front section of a compressor and therefore have a correspondingly great height and, moreover, are made of a high-temperature resistant alloy, for example a nickel-base alloy, is performed in a first process step on the basis of a 3D blade model (FIGS. 2/3) produced by a design software by straight cutting along a control surface 5 established at a certain distance from the pressure side 3 and the suction side 4, a conical surface 7 located at a certain distance from the annulus surface 6, and a transition surface 8 remaining between the conical surface 7 and the control surface 5. The straight cuts are produced by five-axis abrasive waterjet cutting for which certain parameters, such as type of the abrasive medium, mass or volume flow of the abrasive medium or water, nozzle diameter, nozzle-to-workpiece distance, feed rate and working pressure are selected in accordance with the material used. Following the production of the pre-machining contour by waterjet cutting, a final machining process is performed in which the final contour of the blade interspace is produced by finish milling or electro-chemical machining.

However, the pre-machining geometry or contour must be pre-produced such in dependence of the static and dynamic loading occurring during the finish machining process, actually by inclusion of the cutting forces, clamping conditions, material properties and cutting force directions, that the static and dynamic stiffness of the blades during finish machining is ensured. For this purpose, the control surfaces 5 are produced in the blade model by parallel tangential lines 9 applied to the two opposite blade surfaces and distance lines 10 produced equidistantly to the tangential lines 9, with the both-side control surfaces subsequently being established from the distance lines 10. Then, the conical surface 7 extending at a certain distance from the annulus surface 6 and, subsequently, the transition surface 8 between the conical surface 7 and the control surface 5 are produced in the 3D blade model. The static and dynamic stiffness of the previously produced pre-machining geometry is simulated by a finite element computation program, taking into account the load situation to be expected during final cutting and machining of the blades. If necessary, the control surfaces 5 and the conical and transition surfaces 7, 8 will be modified in consequence of the computation.

By waterjet cutting of a disk 2 or a ring from the solid material by straight cuts with changing cutting angle in accordance with the control surfaces established as well as the conical and transition surfaces, a stiffness-optimized contour is produced for subsequent final machining in a five-axis milling process in which the final contour of the blade surfaces is generated merely by finishing.

Cutting off the space between the blades by straight cuts for producing a stiffness-optimized contour for the subsequent finishing process, compared with mere machining from the solid, lowers the machining time and tooling costs and, thus, the manufacturing costs and is advantageously used for the machining of high-temperature resistant and brittle-hard materials. Several blade interspaces can simultaneously be cut out by using multi-head waterjet cutting equipment.

The present invention is not limited to the above described embodiment. For example, other cutting methods, such as laser beam cutting, plasma beam cutting or wire spark erosion, can be used instead of abrasive waterjet cutting. Also, stators with integral blading can be produced in like manner.

List of Reference Numerals
1 Blade
2 Blisk (disk)
3 Pressure side
4 Suction side
5 Control surface
6 Annulus surface
7 Conical surface
8 Transition surface
9 Tangential lines
10 Distance lines

What is claimed is:

1. A method for fabricating at least one chosen from integrally bladed rotors and stators for gas-turbine engines, comprising:
cutting a stiffness-optimized pre-machining contour into a blank with a cutting process, the pre-machining contour being cut:
by a plurality of essentially straight cuts;
at a certain distance from what will become respective pressure sides and suction sides of adjacent blades along straight control surfaces at a cutting angle varying in correspondence with a blade twist, the essentially straight cuts made transversely to the blades giving each portion of the blank to become a blade an essentially quadrilateral transverse cross-section along its length;
along a conical surface extending a certain distance from what will become an annulus surface at bases of the blades; and
along a transition surface between the conical surface and the control surfaces; and
subsequently finishing the blank to a final contour of the suction sides and the pressure sides of the blades, the annulus surface and the transition surface in a finishing process which follows the final contour; the finishing process being a different type of process than the cutting process.

2. The method of claim 1, and further comprising establishing, in a 3D model of the pre-machining contour provided for CNC programming, the control surfaces by distance lines arranged transversely to a blade and over a length of the blade, these distance lines extending at a certain distance and in parallel to two tangential lines, one of the tangential lines being transversely tangential to leading and trailing edge portions of a pressure side of the final contour and an other of the tangential lines being transversely tangential to a center portion of a suction side of the final contour, the two tangential lines being parallel to each other.

3. The method of claim 2, and further comprising reviewing the 3D model of the pre-machining contour for CNC programming by finite element model simulation, taking into account cutting process and finishing process parameters, for proving sufficient static and dynamic stiffness for the following finishing process, and, if indicated by such reviewing, modifying the 3D model.

4. The method of claim 3, wherein the cutting process is done by five-axis abrasive waterjet cutting.

5. The method of claim 3, wherein the cutting process is done by at least one chosen from laser beam cutting, plasma beam cutting and wire spark erosion.

6. The method of claim 1, wherein the cutting process is done by five-axis abrasive waterjet cutting.

7. The method of claim 1, wherein the cutting process is done by at least one chosen from laser beam cutting, plasma beam cutting and wire spark erosion.

8. The method of claim 2, wherein the cutting process is done by five-axis abrasive waterjet cutting.

9. The method of claim 2, wherein the cutting process is done by at least one chosen from laser beam cutting, plasma beam cutting and wire spark erosion.

10. The method of claim 1, and further comprising establishing a 3D model of the pre-machining contour provided for CNC programming, and further comprising reviewing the 3D model of the pre-machining contour for CNC programming by finite element model simulation, taking into account cutting process and finishing process parameters, for proving sufficient static and dynamic stiffness for the following finishing process, and, if indicated by such reviewing, modifying the 3D model.

11. The method of claim 10, wherein the cutting process is done by five-axis abrasive waterjet cutting.

12. The method of claim 10, wherein the cutting process is done by at least one chosen from laser beam cutting, plasma beam cutting and wire spark erosion.

* * * * *